UNITED STATES PATENT OFFICE.

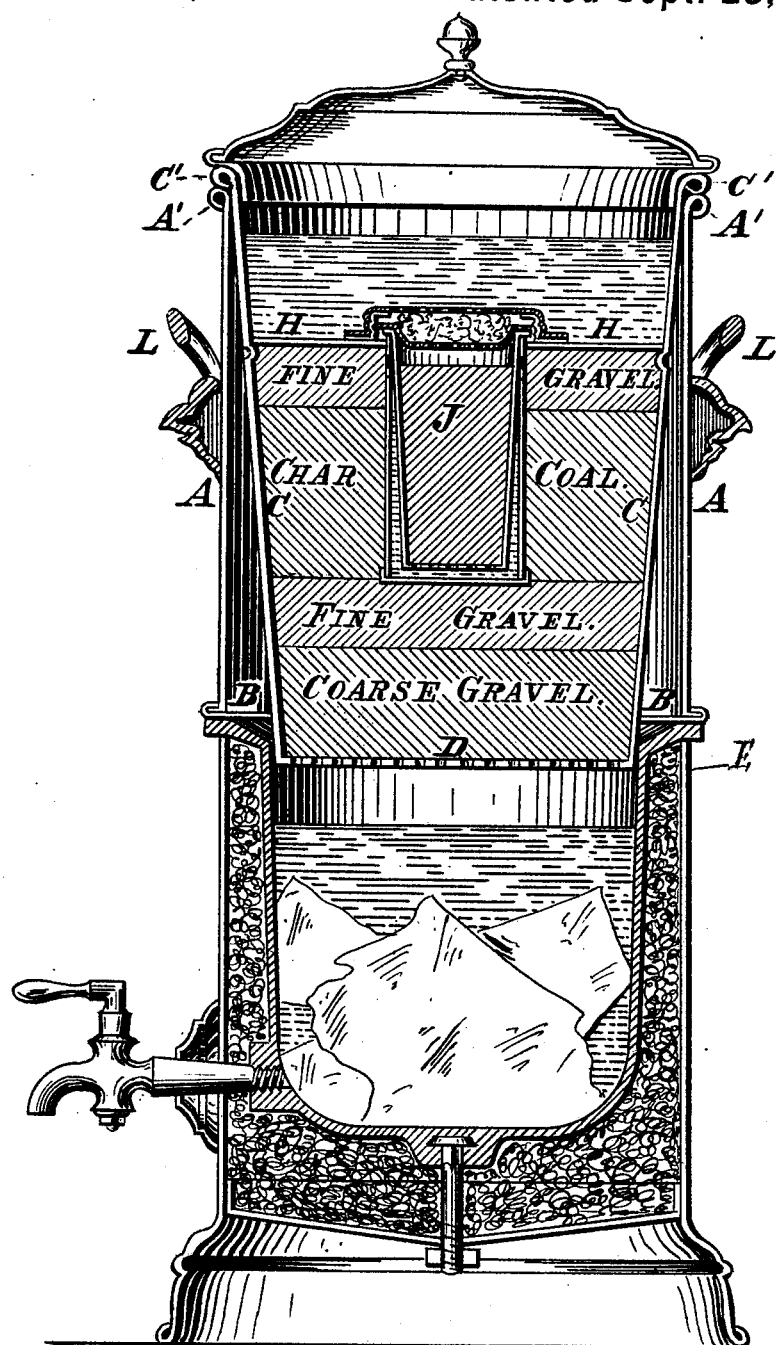

EDGAR B. JEWETT, OF BUFFALO, NEW YORK.

IMPROVEMENT IN COMBINED FILTER AND COOLER.

Specification forming part of Letters Patent No. 219,817, dated September 23, 1879; application filed July 22, 1879.

*To all whom it may concern:*

Be it known that I, EDGAR B. JEWETT, of Buffalo, in the county of Erie and State of New York, have invented certain new and useful Improvements on a Combined Filter and Cooler; and I do hereby declare that the following description of my said invention, taken in connection with the accompanying drawing, forms a full, clear, and exact specification, which will enable others skilled in the art to which it appertains to make and use the same.

This invention has special reference to a combined water filter and cooler; and it consists, essentially, in the peculiar combination of parts and details of construction as hereinafter first fully set forth and described, and then pointed out in the claims.

Heretofore I have been making combined filters and coolers having a removable filtering-cup inserted into a vessel embedded in a permanent filtering-bed, said vessel being fixed to a division-plate on the top surface of said filtering-bed. This construction did not admit of a ready removal and cleaning of the filtering-strata, and therefore compelled the owner to send the filter to the manufacturers.

To avoid this seeming objection I manufactured the filter for which Letters Patent were granted J. C. Jewett, October 15, 1878, in which the parts were made separable, so as to enable the user to bisect, clean the strata, and refill the filter, and thus save the expense of sending the same to the manufacturers.

Experience, however, has demonstrated that people in general will not attempt to clean their filters, and, when doing so, will in most cases fail to rearrange the several strata in their proper order, dimension, &c., and will, generally, prefer to have an experienced hand do the task for them. This, however, is also objectionable, because in separating the diaphragms from their shell the painting is generally so dilapidated as to require repainting, which is more or less expensive, and the contrast between the newly-painted filter and the old cooler or lower part of the apparatus too glaring to be tolerated.

To overcome these new objections, I have constructed the filter and cooler shown in the accompanying drawing, already referred to, in which the figure is a longitudinal sectional elevation, and in which I have removably inclosed the entire filtering-strata into a shell, forming the upper part of the filter and cooler combined, so that, in case of foulness of the cooler from extended use, the entire vessel containing the permanent bed may be thrown away, and a new one substituted at an expense generally not exceeding that for repairing and renewing the old filter.

A in the drawing designates the exterior shell of my filter. It is wired on its upper edge, and provided with an inwardly-projecting flange, B, double seamed to the lower end of said shell.

C is the filter-shell proper. It is in the contour of an inverted frustum of a cone, the base of which, as it were, forming the upper part of said shell. The upper edge of the shell is likewise wired to stiffen the same, and to serve as a rest for said shell C upon the upper edge of the shell A, and the lower end closed by a perforated bottom, D, through which the filtered water escapes into the cooler. The size of the lower end of this shell C is such as to snugly fit the inwardly-projecting flange B. This flange sustains the shell A by frictional contact, the said shell C being constructed to pass through said flange B a sufficient distance to prevent capillary attraction from causing the water escaping the perforated bottom passing up the sides of such shell C, and discharging in the joint between the shell A and the shell E of the water-cooler.

Within the shell C, I place the diaphragm H, the same as shown in Letters Patent of October 15, 1878, except that said diaphragm is now permanently affixed to the shell C, and the permanent filtering-bed, consisting of a succession of strata of fine gravel, charcoal, fine gravel, and coarse gravel, therefore now removable, the filtering-cup J, with its contents of fine gravel and sponge, being arranged identically the same as that described in said Letters Patent.

By thus constructing the combined filter and cooler its first cost may be slightly increased, owing to the fact that there are two shells in the filter; but its subsequent expense for replacing the filter proper is considerably decreased, because the always most expensive ornamental exterior shell is retained, and only the shell C, with the diaphragm H and perforated bottom D, together with the inexpensive strata of filtering substances, discarded, which parts can be cheaply furnished, and thus overcome all objections and troubles connected with the refilling of a foul filter.

In removing the filter from the cooler for the introduction of the refrigerating agent, the exterior shell, A, is taken hold of by the handles L, when the wired part C' of the shell C, resting upon the upper edge, A', of the shell A, will remove the entire filter by removing said shell, while the latter is prevented from dropping off the vessel C by the flange B embracing the lower end of said shell C.

Filter-shell C is provided with an inner annular bead, which supports diaphragm or plate H.

Having thus fully described my invention, I claim as new and desire to secure to me by Letters Patent of the United States—

1. In combination with the cooler-chamber and its shell E, the filter-shell C and the exterior upper shell, A, provided with inner annular flange, B, which braces said filter-shell on all sides of its lower end, substantially as shown.

2. In combination with outer shell, A, the filter-shell C, having an inner bead, and the diaphragm H and vessel J supported by said bead, substantially as shown.

3. In combination with the cooler-chamber and its shell E, the filter-shell C, the exterior upper shell, and an intervening bracing device for preventing displacement, said filter-shell being extended below said bracing device, substantially as set forth.

In testimony that I claim the foregoing as my invention I have hereto set my hand and affixed my seal in the presence of two subscribing witnesses.

EDGAR B. JEWETT. [L. S.]

Attest:
 MICHAEL J. STARK,
 EMMA A. S. DOPP.